United States Patent
Andre-Masse et al.

(10) Patent No.: US 11,904,816 B2
(45) Date of Patent: Feb. 20, 2024

(54) LIQUID RECOVERY SYSTEM FOR A MOTOR VEHICLE

(71) Applicant: Valeo Systemes d'Essuyage, La Verriere (FR)

(72) Inventors: Laurent Andre-Masse, La Verriere (FR); Philippe Carraro, La Verriere (FR); Julien Carrion, La Verriere (FR); Pierre-Francois Duprat, La Verriere (FR); Jean-Francois Rousseau, La Verriere (FR); Grégory Villemin, La Verriere (FR)

(73) Assignee: VALEO SYSTEMES D'ESSUYAGE, LaVerriere (FR)

( * ) Notice: Subject to any disclaimer, the term of this patent is extended or adjusted under 35 U.S.C. 154(b) by 649 days.

(21) Appl. No.: 17/055,356

(22) PCT Filed: May 22, 2019

(86) PCT No.: PCT/EP2019/063166
§ 371 (c)(1),
(2) Date: Nov. 13, 2020

(87) PCT Pub. No.: WO2019/224223
PCT Pub. Date: Nov. 28, 2019

(65) Prior Publication Data
US 2021/0107435 A1    Apr. 15, 2021

(30) Foreign Application Priority Data

May 24, 2018  (FR) ...................................... 1854375

(51) Int. Cl.
*B60S 1/50*     (2006.01)
*B01D 21/00*    (2006.01)
(Continued)

(52) U.S. Cl.
CPC ............ *B60S 1/50* (2013.01); *B01D 21/0006* (2013.01); *B01D 29/014* (2013.01); *B01D 29/11* (2013.01); *B01D 29/62* (2013.01); *B60S 1/56* (2013.01)

(58) Field of Classification Search
None
See application file for complete search history.

(56) References Cited

U.S. PATENT DOCUMENTS 743,801 A * 11/1903 Anderson ................... 15/250.33
1,112,793 A * 10/1914 Heineman ................. B60S 1/14
15/250.32
(Continued)

FOREIGN PATENT DOCUMENTS

DE         4316345 A1     11/1994
DE         20022285 U1    7/2001
(Continued)

OTHER PUBLICATIONS

European Patent Office, Communication from the Examining Division of corresponding European Application No. 19724851.1, dated Jun. 2, 2022.
(Continued)

*Primary Examiner* — Robert J Popovics
(74) *Attorney, Agent, or Firm* — Valeo Systemes D'Essuyage (57) ABSTRACT

The invention relates to a liquid recovery system for a motor vehicle and to a vehicle including such a recovery system that that includes at least one liquid intake that communicates with a tank and is referred to as the first tank, which is designed to store liquid from the liquid intake and where the liquid intake is arrangeably designed below the vehicle's beltline.

9 Claims, 3 Drawing Sheets

(51) Int. Cl.
  *B01D 29/01*  (2006.01)
  *B01D 29/11*  (2006.01)
  *B01D 29/62*  (2006.01)
  *B60S 1/56*  (2006.01)

(56) References Cited

U.S. PATENT DOCUMENTS

| | | | | |
|---|---|---|---|---|
| 1,787,155 A * | 12/1930 | Ingwer | B60S 1/66 | 239/289 |
| 1,993,684 A * | 3/1935 | Rogers | B60S 1/50 | 296/211 |
| 2,187,117 A * | 1/1940 | Faulkner | B60S 1/48 | 52/171.2 |
| 2,770,017 A * | 11/1956 | Oishei | B60S 1/48 | 239/284.1 |
| 3,351,836 A * | 11/1967 | Kearns | B60S 1/483 | 318/443 |
| 3,483,459 A * | 12/1969 | Kearns | B60S 1/482 | 318/447 |
| 3,500,159 A * | 3/1970 | Kearns | B60S 1/482 | 318/443 |
| 3,529,227 A * | 9/1970 | Kearns | B60S 1/482 | 318/443 |
| 3,573,584 A * | 4/1971 | Kearns | B60S 1/483 | 318/443 |
| 3,581,178 A * | 5/1971 | Kearns | B60S 1/0807 | 318/443 |
| 3,582,747 A * | 6/1971 | Kearns | B60S 1/0807 | 318/443 |
| 3,593,090 A * | 7/1971 | Kearns | B60S 1/482 | 318/444 |
| 3,602,790 A * | 8/1971 | Kearns | B60S 1/0807 | 318/443 |
| 3,658,074 A * | 4/1972 | Wright | B60S 1/603 | 15/250.002 |
| 3,721,115 A * | 3/1973 | Kearns | G01N 19/02 | 73/146 |
| 3,728,603 A * | 4/1973 | Kearns | B60S 1/0807 | 318/443 |
| 3,737,750 A * | 6/1973 | Kearns | B60S 1/483 | 318/443 |
| 3,738,575 A * | 6/1973 | Somer | B60S 1/50 | 239/284.1 |
| 3,774,091 A * | 11/1973 | Kearns | H02P 3/12 | 318/443 |
| 3,779,324 A * | 12/1973 | Kreske, Jr. | B60B 39/02 | 291/1 |
| 3,796,936 A * | 3/1974 | Kearns | B60S 1/0807 | 318/443 |
| 3,846,867 A * | 11/1974 | Bryant | B60S 1/62 | 15/250.002 |
| 3,876,919 A * | 4/1975 | Kearns | H02P 7/2913 | 388/819 |
| 3,902,106 A * | 8/1975 | Kearns | B60S 1/483 | 318/443 |
| 4,248,383 A * | 2/1981 | Savage | B60S 1/48 | 239/284.2 |
| 4,339,698 A * | 7/1982 | Kearns | B60S 1/482 | 318/483 |
| 4,494,059 A * | 1/1985 | Kearns | G01N 19/02 | 318/443 |
| 4,544,870 A * | 10/1985 | Kearns | B60S 1/482 | 318/DIG. 2 |
| 4,824,021 A * | 4/1989 | Binder | B60S 1/50 | 417/430 |
| 5,024,383 A * | 6/1991 | Vaschetto | B62D 21/16 | 296/193.11 |
| 5,046,449 A * | 9/1991 | Nelson | B60S 1/481 | 134/123 |
| 5,141,160 A * | 8/1992 | Waters | B60S 1/50 | 239/284.1 |
| 5,157,314 A * | 10/1992 | Kuhbauch | B60S 1/08 | 318/443 |
| 5,261,254 A * | 11/1993 | Cattane | B60H 1/32331 | 15/250.1 |
| 5,327,613 A * | 7/1994 | Ohtsu | B60S 1/50 | 239/284.1 |
| 5,435,151 A * | 7/1995 | Han | B01D 1/0017 | 62/239 |
| 5,561,882 A * | 10/1996 | Eustache | B60S 1/50 | 15/250.04 |
| 5,651,259 A * | 7/1997 | Twyman | B60S 1/50 | 62/93 |
| 5,669,986 A * | 9/1997 | Buchanan, Jr. | B60S 1/50 | 15/103 |
| 5,853,580 A * | 12/1998 | Rusinol | B60S 1/50 | 210/172.3 |
| 5,946,763 A * | 9/1999 | Egner-Walter | B60S 1/0416 | 15/250.02 |
| 6,024,803 A * | 2/2000 | Buchanan, Jr. | B62D 25/081 | 15/103 |
| 6,209,573 B1 * | 4/2001 | Chau | F16K 31/22 | 137/340 |
| 6,236,180 B1 * | 5/2001 | Contos | B60S 1/485 | 318/482 |
| 6,266,842 B1 * | 7/2001 | Muller | B60S 1/50 | 239/303 |
| 6,467,698 B2 * | 10/2002 | Gaarder | B60H 3/022 | 165/41 |
| 6,554,565 B2 * | 4/2003 | Suzuki | F04D 13/06 | 415/121.2 |
| 6,752,161 B2 * | 6/2004 | Hernandez | B60S 1/68 | 134/123 |
| 7,509,964 B2 * | 3/2009 | Fistler | B60S 1/481 | 134/123 |
| 7,614,412 B2 * | 11/2009 | Yamaguchi | F04D 15/005 | 137/391 |
| 7,845,362 B2 * | 12/2010 | Morris | H01M 8/06 | 134/123 |
| 7,905,427 B2 * | 3/2011 | Arkashevski | B60S 1/488 | 239/284.1 |
| 8,082,940 B2 * | 12/2011 | Na | F16K 17/34 | 137/351 |
| 8,366,022 B2 * | 2/2013 | Arkashevski | B60S 1/488 | 239/284.1 |
| 8,391,695 B2 * | 3/2013 | Arkashovski | B60S 1/488 | 392/491 |
| 8,561,917 B2 * | 10/2013 | Arkasjevski | F28F 19/006 | 239/128 |
| 8,683,821 B2 * | 4/2014 | Volk | B01D 29/15 | 62/291 |
| 8,865,002 B2 * | 10/2014 | Weigle | B60S 1/50 | 137/59 |
| 9,000,000 B2 * | 4/2015 | Carroll | B01D 15/362 | 210/171 |
| 9,120,465 B2 * | 9/2015 | Uyanik | B60S 1/50 | |
| 9,434,356 B1 * | 9/2016 | Puente Fernandez | B60S 1/50 | |
| 9,499,133 B2 * | 11/2016 | Grasso | B60S 1/524 | |
| 9,650,018 B2 * | 5/2017 | Carroll | B60S 1/50 | |
| 9,855,924 B2 * | 1/2018 | Quintero Perez | B60S 1/50 | |
| 9,914,486 B2 * | 3/2018 | Remes | B62D 25/12 | |
| 10,093,283 B2 * | 10/2018 | Carroll | B60S 1/50 | |
| 10,150,453 B2 * | 12/2018 | Busiello | B01D 21/0045 | |
| 10,155,492 B2 * | 12/2018 | Felix Frias | B60R 16/08 | |
| 10,442,405 B2 * | 10/2019 | Weigle | B60S 1/488 | |
| 10,480,163 B2 * | 11/2019 | Dudar | B60N 3/16 | |
| 10,532,775 B2 * | 1/2020 | Remes | B62D 25/12 | |
| 10,576,939 B2 * | 3/2020 | Barret | B62D 25/081 | |
| 10,647,303 B2 * | 5/2020 | Sasaki | F24H 15/20 | |
| 10,717,417 B2 * | 7/2020 | Regalado | B60S 1/50 | |
| 10,723,324 B2 * | 7/2020 | Carroll | B60S 1/48 | |
| 10,889,151 B2 * | 1/2021 | Niemann | B60C 11/246 | |
| 10,960,854 B2 * | 3/2021 | Richardson | B60S 1/603 | |
| 11,034,388 B2 * | 6/2021 | Remes | B62D 25/12 | |
| 11,209,301 B2 * | 12/2021 | Arreaza | F01N 9/00 | |
| 11,209,840 B2 * | 12/2021 | Garcia Crespo | G05D 9/00 | |
| 11,351,967 B2 * | 6/2022 | Ansaldi | B60S 1/48 | |

(56) References Cited

U.S. PATENT DOCUMENTS

| | | | |
|---|---|---|---|
| 11,628,810 B2* | 4/2023 | Kong | B60S 1/50 392/447 |
| 2003/0041900 A1* | 3/2003 | Wojan | B60S 1/481 137/79 |
| 2004/0237561 A1* | 12/2004 | Duarte Barreto Junior | B60H 1/3233 62/291 |
| 2005/0284503 A1* | 12/2005 | Franco | B60S 1/488 134/123 |
| 2007/0017559 A1* | 1/2007 | Yamaguchi | B60S 1/481 134/123 |
| 2007/0084228 A1* | 4/2007 | Heck | B60H 1/32331 62/285 |
| 2007/0084484 A1* | 4/2007 | Porter | B60S 1/487 134/123 |
| 2008/0277497 A1* | 11/2008 | Shank | B60S 1/482 239/284.1 |
| 2009/0151107 A1* | 6/2009 | Shank | B60S 1/482 15/250.05 |
| 2010/0025311 A1* | 2/2010 | Jones | C02F 1/048 222/173 |
| 2011/0056986 A1* | 3/2011 | Shank | B05B 9/002 222/146.2 |
| 2011/0089120 A1* | 4/2011 | Weigle | B60S 1/50 210/744 |
| 2012/0056004 A1* | 3/2012 | Trager | B60S 1/50 239/284.1 |
| 2012/0192959 A1* | 8/2012 | Wein | B60S 1/50 137/98 |
| 2012/0204374 A1* | 8/2012 | Shank | B60S 1/50 15/250.05 |
| 2013/0206266 A1* | 8/2013 | Stenhouse | C02F 1/32 137/899.4 |
| 2013/0240419 A1* | 9/2013 | Carroll | B01D 15/362 210/95 |
| 2014/0230959 A1* | 8/2014 | Uyanik | B60S 1/50 141/82 |
| 2014/0367488 A1* | 12/2014 | Dominique | B60S 1/481 239/284.1 |
| 2015/0203075 A1* | 7/2015 | Carroll | B01D 15/363 210/95 |
| 2016/0046184 A1 | 2/2016 | Luehn et al. | |
| 2016/0121854 A1* | 5/2016 | Grasso | B60S 1/482 134/6 |
| 2016/0332601 A1* | 11/2016 | Carroll | B01D 35/027 |
| 2017/0120876 A1* | 5/2017 | Busiello | B01D 21/0045 |
| 2017/0225658 A1* | 8/2017 | Quintero Perez | B60L 1/003 |
| 2018/0162327 A1* | 6/2018 | Lansinger | F24H 1/009 |
| 2018/0215352 A1* | 8/2018 | Barret | G05D 9/12 |
| 2018/0297561 A1* | 10/2018 | Regalado | B60S 1/50 |
| 2019/0039576 A1* | 2/2019 | Ansaldi | B60S 1/38 |
| 2019/0143758 A1* | 5/2019 | Niemann | B60C 11/246 73/146 |
| 2020/0001831 A1* | 1/2020 | Kong | B60S 1/50 |
| 2020/0198590 A1* | 6/2020 | Carroll | B60S 1/50 |
| 2020/0326221 A1* | 10/2020 | Arreaza | G01F 22/00 |
| 2021/0107435 A1* | 4/2021 | Andre-Masse | B01D 29/11 |
| 2022/0281419 A1* | 9/2022 | Raviv | B60S 1/50 |
| 2023/0104642 A1* | 4/2023 | Cohrs | B60S 1/50 134/58 R |
| 2023/0166693 A1* | 6/2023 | Carroll | C02F 1/001 296/192 |

FOREIGN PATENT DOCUMENTS

| | | | | |
|---|---|---|---|---|
| EP | 0484910 | A1 | 5/1992 | |
| FR | 3081410 | A1 * | 11/2019 | B01D 21/0006 |
| FR | 3081410 | B1 * | 12/2021 | B01D 21/0006 |
| GB | 2315994 | A | 2/1998 | |
| JP | H0971221 | A | 3/1997 | |
| WO | WO-2019224223 | A1 * | 11/2019 | B01D 21/0006 |

OTHER PUBLICATIONS

European Patent Office, International Search Report and Written Opinion of corresponding International Application No. PCT/EP2019/063166, dated Aug. 5, 2019.

* cited by examiner

LIQUID RECOVERY SYSTEM FOR A MOTOR VEHICLE

CROSS-REFERENCE TO RELATED APPLICATIONS

This application is filed under 35 U.S.C. § 371 U.S. National Phase of International Application No. PCT/EP2019/063166 filed May 22, 2019 (published as WO2019224223), which claims foreign priority benefit to French application No. 1854375 filed on May 24, 2018, the disclosures of which are incorporated herein by reference in their entirety.

TECHNICAL FIELD

The invention relates to the technical field of recovering liquid in a vehicle. In particular, the invention relates to a liquid recovery system, the liquid intake of which is located in the lower part of the vehicle, in particularly located under a beltline of the vehicle and, on a door sill of the vehicle, by example.

BACKGROUND

Liquid recovery systems are known, in particular for recovering rainwater, to allow it to be reused, for example, for washing windows or sensors of the motor vehicle.

Containers are thus known that are arranged on the surface of a roof of a motor vehicle. These containers allow rainwater falling on the roof of the vehicle to be recovered and they are connected to a tank.

This tank can be located on the roof of the vehicle or at another place of the motor vehicle, for example, in an engine compartment.

It is also known for troughs to be provided that extend from the roof or top of the motor vehicle to the engine compartment of the motor vehicle. These troughs allow rainwater to be routed to a tank. The rainwater then can be stored therein, then reused.

These designs only allow liquid to be recovered in the upper part of the vehicle, in particular on the roof of the vehicle.

Depending on its location, the volume of the tank is limited by its environment and/or by the bulk of its surrounding elements, for example, when it is located in the engine compartment of the vehicle.

Vehicles are increasingly equipped with all types of sensors for their operation. These sensors need to be regularly cleaned when the vehicle is used.

The vehicles thus require increasing amounts of liquid. A requirement therefore exists for a liquid recovery system that allows a sufficient amount of liquid to be recovered for covering all the requirements of the vehicles.

SUMMARY

To this end, the invention proposes a liquid recovery system for a motor vehicle, the liquid recovery system comprising at least one liquid intake connected to a tank, called first tank, designed to store liquid originating from the liquid intake, wherein the at least one liquid intake is configured to be arranged below the beltline of the vehicle.

By wisely placing one of the liquid intakes on the lower part of the vehicle, it is thus possible, not only to recover the liquid trickling over the vehicle and originating, for example, from the roof of the vehicle, but also the liquid that is on the highway and that is sprayed by the wheels of the vehicle. It is thus possible to recover and store a maximum amount of liquid that subsequently can be reused to clean the windshield, the windows of the vehicle or even the various sensors that are increasingly present in vehicles.

According to various embodiments of the invention, which can be taken together or individually:
  the at least one liquid intake is configured to be arranged on a wheel arch;
  the wheel arch is equipped with two liquid intakes;
  the at least one liquid intake is configured to be arranged on a side of the vehicle;
  the at least one liquid intake is configured to be arranged on the underframe of the vehicle;
  the first tank is configured to be arranged below the beltline of the vehicle;
  the first tank is configured to be arranged on the underframe of the vehicle;
  the first tank is configured to be arranged below the at least one liquid intake, preferably completely below. Such an arrangement helps to lower the center of gravity of the vehicle, due to the weight of the water stored in the first tank;
  the liquid recovery system comprises a treatment device designed to remove impurities from the liquid collected by the at least one liquid intake;
  the treatment device comprises at least one grill. Such a grill has the advantage of being easy to clean from outside the vehicle, in particular with high-pressure water, as in a vehicle washing station;
  the treatment device comprises at least one filter;
  the treatment device comprises at least one decanting system. Advantageously, such a decanting system is configured so as to expel dirt away from the wheels of the vehicle;
  the treatment device comprises at least one filter cartridge;
  the at least one liquid intake comprises an inlet for the liquid;
  the treatment device is at least partly disposed, preferably completely disposed, between the inlet for the liquid and the first tank;
  the treatment device is disposed between the inlet for the liquid and the first tank and remote therefrom;
  the treatment device comprises, in combination, at least one grill, a decanting system, and a filter or a filter cartridge, with the inlet for the liquid being disposed between the grill and the decanting system;
  the inlet is equipped with a plugging means designed to transition from an open position to a closed position as a function of the liquid supply requirement of the first tank. Such a plugging means advantageously avoids having to provide an overflow device for discharging excess water from the first tank. Alternatively or additionally, such a plugging means allows the use of the recovered water treatment means to be limited, by limiting the arrival of water toward the means for treating water that is actually intended to be stored, and therefore allows the wear of the treatment means and/or the cleaning or regeneration thereof to be limited. Furthermore, such a plugging means can allow the at least one liquid intake to be designed and/or configured so as to accept large amounts of water when the first tank is empty or nearly empty, as opposed to using a liquid intake that continually accepts small amounts of water and does not allow the first tank to be quickly filled;

the first tank comprises internal partitions defining a plurality of chambers that are connected together;

the first tank comprises ribs arranged in the bottom of the first tank;

the first tank comprises cells defining a plurality of compartments;

the first tank has a general rectangular, square, circular, H, Y, S or T shape;

the liquid recovery system comprises at least one first pump for supplying the first tank from at least one liquid intake;

the first tank is connected to at least one liquid dispensing means for cleaning windows and/or sensors of the vehicle;

the liquid recovery system comprises at least one pump for supplying the at least one dispensing means with the liquid contained in the first tank;

the liquid recovery system comprises a second tank arranged between the at least one dispensing means and the first tank;

the pump for supplying the at least one dispensing means is designed to supply the second tank;

the treatment device is located on an inlet of at least one liquid intake;

the treatment device is located on an intermediate decanting tank;

the treatment device is located between the liquid intake and the first tank;

the treatment device is located between the first tank and the second tank;

the treatment device comprises at least one self-cleaning means;

the liquid recovery system comprises a set of piping arranged to cause the liquid to circulate between the various elements of the liquid recovery system;

the liquid recovery system comprises a device for heating the liquid;

the heating device is arranged in the first tank;

the heating device comprises heating films;

the heating films are arranged in the first tank;

the heating device is configured so that the liquid is heated by an exhaust line of a combustion engine of the motor vehicle;

the liquid recovery system comprises a means for manually filling the first tank;

the manual filling means is an opening for connecting to an external liquid source;

the liquid recovery system comprises a sensor for sensing the filling level of the first tank;

the collected liquid originates from rainwater and/or a liquid on the highway and/or liquids for washing the vehicle.

The invention also relates to a motor vehicle provided with a liquid recovery system as described above.

DETAILED DESCRIPTION OF THE DRAWINGS

Further features and advantages of the invention will become apparent from reading the following detailed description, which is understood with reference to the accompanying drawings, in which.

DETAILED DESCRIPTION

Throughout the remainder of the description, elements having an identical structure or similar functions will be denoted using the same reference signs.

The invention relates to a liquid recovery system 1 for a vehicle, such as a motor vehicle 3, comprising at least one liquid intake 5 vertically arranged below the beltline of the vehicle.

A "liquid intake" is understood to be a device that collects, recovers liquid. Several embodiments of the liquid intake can be contemplated, as illustrated hereafter.

Figure 11:
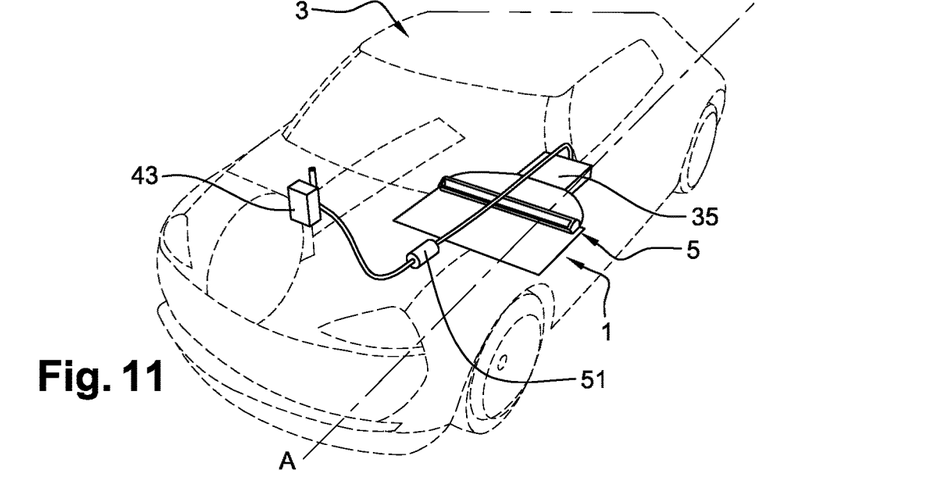
FIG. 11 is a perspective view of a motor vehicle comprising the liquid recovery system of FIGS. 8 to 10.

In the case of a motor vehicle 3, "beltline" is understood to be the line A-A (shown in FIGS. 7 and 11) that is substantially defined by the lower limit of the side windows of the motor vehicle 3 and the upper part of the bodywork of the doors intended to allow the users of the motor vehicle 3 to access the passenger compartment of the motor vehicle 3. The liquid to be recovered can be, for example, rainwater, a cleaning liquid or even a deicing product. The liquid recovery system 1 thus can allow a liquid to be recovered that is used during washes, in particular of the vehicle.

FIGS. 1 to 5 illustrate a first embodiment of the liquid intake 5. In this embodiment, the liquid intake 5 is arranged on a wheel arch 7.

In particular, each wheel arch 7 is equipped with two liquid intakes 5.

Given that standard "195/65R15" type tires as of May 2018 discharge up to 15 liters of water per second on a wet road, some of which cannot be recovered since it is expelled toward the outside of the vehicle and in particular under its chassis, each liquid intake 5 arranged on a wheel arch 7 can allow recovery of between approximately 0.5 and 5 liters of liquid per second, and ideally of approximately 2 liters of liquid per second.

Figure 1:
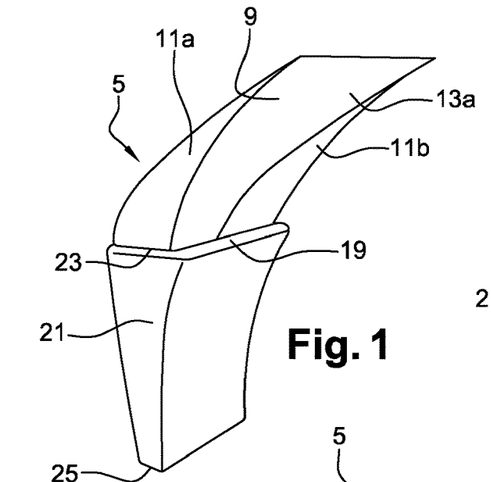
FIGS. 1 to 4 are perspective views of part of a first embodiment of a liquid recovery system according to the invention comprising a first example of a liquid intake.
Figure 2:
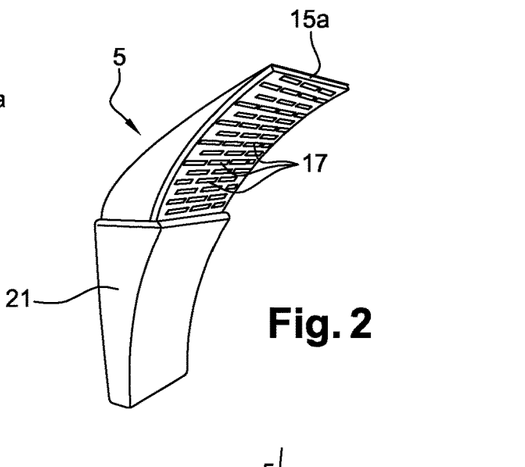

Each liquid intake 5 has a rectangular bottom 9 connecting two side edges 11a, 11b. The edges 11a, 11b extend along the long sides of the bottom 9, whilst broadening so as to form a scoop having an inlet 13a for the liquid, as shown in FIG. 1. The bottom 9 has a curved or bent profile similar to the curvature of the wheel arch 7. The inlet 13a can be provided with a grill 15a, as shown in FIGS. 2 to 6. The grill 15a is a plate designed to be placed at the inlet 13a of the liquid intake 5. It is provided with perforations 17. The perforations 17 are small openings or small through holes. They are designed to allow liquid to enter through the plate, whilst retaining any impurities.

In the embodiment shown herein, the perforations 17 are evenly distributed over the grill 15a. They are rectangular shaped and all have identical or substantially identical dimensions.

As alternative embodiments, not shown, the perforations 17 can be unevenly distributed, in particular by varying the distance between them so as to modify the distribution of the entry of the liquid. The shape of the perforations 17 can be circular, square or any other shape allowing a liquid to enter and allowing impurities to be retained. Similarly, the dimensions of the perforations 17 can be variable.

In this embodiment, the liquid intake 5 has an outlet 19 emerging in an intermediate decanting tank 21.

It is a decanting system that allows separation of the recovered liquid and the impurities, in particular solid particles, that fall to the bottom by gravitation. The supernatant liquid is thus cleansed of most of its impurities.

The intermediate decanting tank 21 assumes the shape of a funnel. It thus has a transverse inlet section 23, the shape and size of which is similar to that of the outlet 19 of the liquid intake 5. This inlet section 23 extends up to a base 25, whilst progressively narrowing.

Figures 3, 4, 5:
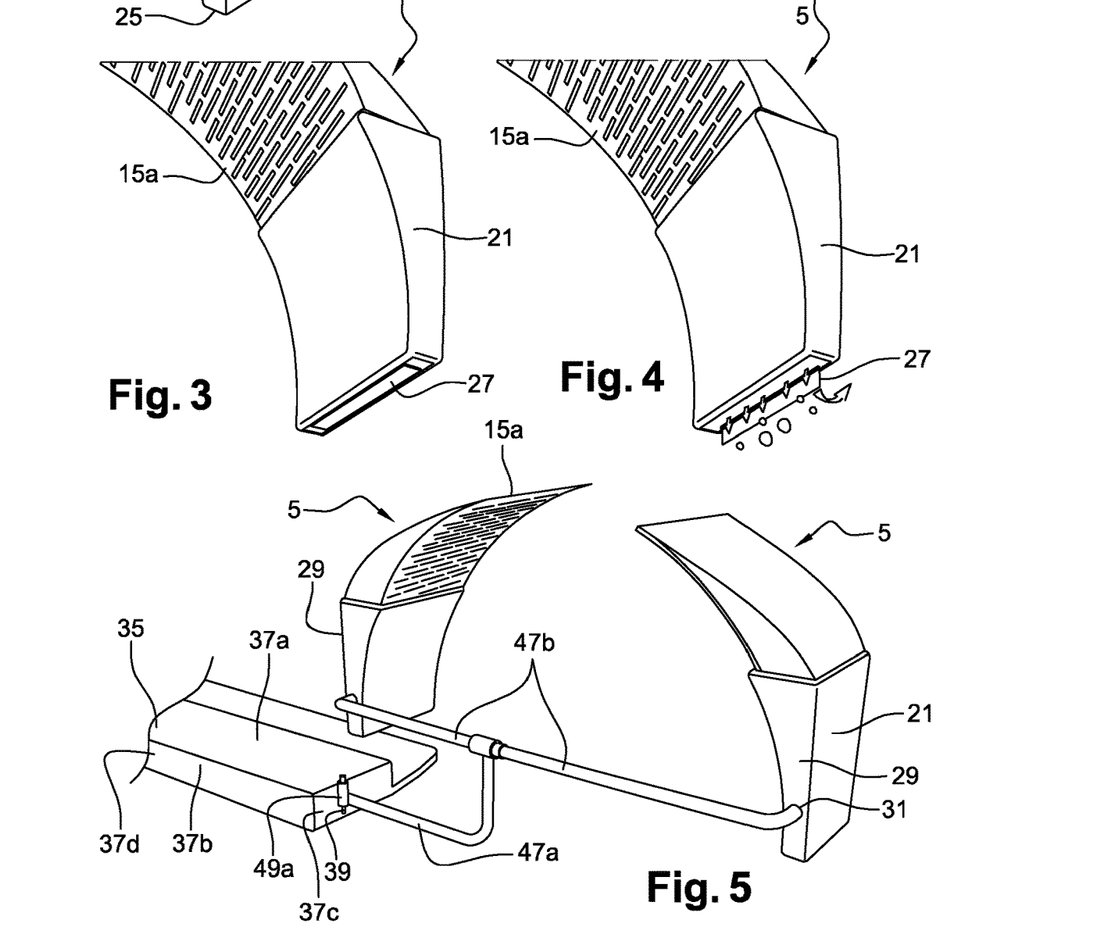
FIG. 5 is a perspective view of two liquid intakes of FIGS. 1 to 4 connected to a tank.

The base 25 of the intermediate decanting tank 21 in this case comprises a valve 27, as shown in FIGS. 3 and 4. The valve 27 is pivotable, in this case about an axis parallel to the axis of rotation of the wheel. The valve 27 thus can be open in order to release the impurities accumulated in the intermediate decanting tank 21, and optionally release the recovered liquid, for example, for cleansing the intermediate decanting tank 21, or even in the event of an excessive amount of recovered liquid.

One of the side walls 29 of the intermediate decanting tank 21, in this case the wall 29 directed toward the inside of the motor vehicle 3, comprises an outlet orifice 31, shown in FIG. 5. The outlet orifice 31 allows the liquid to flow, in particular the liquid that is cleansed of its impurities, for example, toward the rest of the liquid recovery system 1.

This outlet orifice 31 is connected to a set of piping allowing the recovered liquid to be routed toward a tank, called first tank 35, which is designed to store the liquid originating from the liquid intake 5. The liquid intake 5 is thus connected to the first tank 35.

The first tank 35 is arranged below the beltline of the vehicle, more specifically on the underframe of the vehicle.

The first tank 35 comprises a horizontal upper wall 37a and a horizontal lower wall 37b connected by vertical transverse walls 37c and vertical side walls 37d, so as to form a closed receptacle for storing the recovered liquid.

The various walls 37a, 37b, 37c, 37d can comprise orifices, called inlet orifices 39, for introducing the liquid originating from the liquid intakes 5 and can comprise orifices, called outlet orifices 41, for discharging the stored liquid, particularly with a view to supplying the rest of the liquid recovery system 1 with liquid.

The length and the width of the first tank 35 thus can be substantially equal, respectively, to a length and to a width of the underframe of the vehicle, with the length and the width of the underframe of the vehicle being measured parallel or substantially parallel, respectively, to the length and to the width of the vehicle.

The first tank 35 can also extend into only one portion of the underframe of the vehicle, in particular, the first tank 35 extends between the front wheels and the rear wheels of the vehicle.

The height of the tank is limited by the ground clearance, so that the first tank 35 does not touch the ground, in particular when the vehicle passes over an obstacle.

The first tank 35 thus can assume a general rectangular, square, circular shape, or a more complex H, Y, S or T shape.

The arrangement of the first tank 35 below the beltline of the vehicle thus allows a first tank 35 to be arranged that has a large storage capacity.

The first tank 35 thus has a storage capacity of several liters, in particular between 10 and 60 liters, preferably between 20 and 30 liters. By way of an illustration, the storage volume of the first tank 35 is approximately 25 liters.

Figure 7:
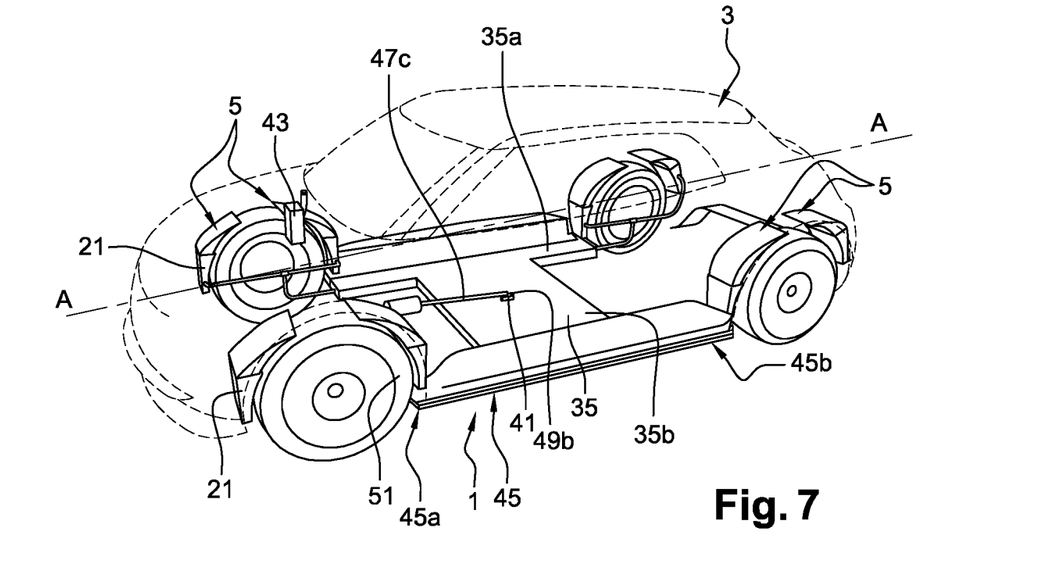
FIG. 7 is a perspective view of a motor vehicle comprising the liquid recovery system of FIGS. 1 to 6.

In the embodiment shown herein and fully shown in FIG. 7, the first tank 35 has a general H-shape. The first tank 35 thus has two parallel longitudinal branches 35a, one to the right and one to the left of the vehicle, each extending between a front wheel and a rear wheel. The two branches 35a are connected by a perpendicular central transverse branch 35b.

Each branch 35a of the first tank 35 comprises two inlet orifices 39 allowing connection of the liquid intakes 5 arranged in the wheel arches 7.

The central crossmember 35b comprises an outlet orifice 41 arranged on the upper wall 37a of the first tank 35. The outlet orifice 41 allows the liquid stored in the first tank 35 to be routed toward the rest of the liquid recovery system 1, in particular to connect the first tank 35 to at least one liquid dispensing means (not shown) for cleaning windows and/or sensors of the vehicle.

Furthermore, the first tank 35 can comprise ribs (not shown) arranged in the bottom of the first tank 35 or even internal cells (not shown) or internal partitions (not shown) defining a plurality of chambers or compartments in fluid communication with each other.

The amount of liquid contained in the first tank 35 is thus distributed in a plurality of compartments, which allows its mass to be better distributed and movements of liquid to be limited that can generate noise when it comes into contact with the side walls 37d of the first tank 35. This also avoids the formation of an imbalance due to the movement of an excessive amount of liquid when the vehicle moves (in particular when cornering, braking, accelerating, etc.).

The shape of the partitions can vary. They can be applied and fixed onto one of the lower 37b or upper 37a walls of the first tank 35 or can be distributed over both. As an alternative embodiment, the partitions can be formed as a single part with one of the walls 37a, 37b or can be distributed and formed as a single part with the two walls 37a, 37b.

The first tank 35 can be made of plastic material or any other suitable material.

The liquid recovery system 1 can comprise a treatment device designed to remove impurities from the liquid.

"Treatment" is understood to be all the operations and/or steps performed on the recovered liquid to eliminate the maximum amount of impurities therefrom, so that it can be used in the cleaning systems of the vehicle.

It can involve a grill 15a, a filter, a decanting system (for example, an intermediate decanting tank 21), a filter cartridge 51, an additive or any other element or device designed to treat the recovered liquid.

Preferably, the grills are used to retain the large elements, such as stones, branches, leaves or any elements that can be sprayed from the road.

The filters can be filters retaining hydrocarbons or oils that can be mixed with the recovered liquid and that need to be eliminated to avoid clogging up the liquid recovery system 1 and to obtain efficient cleaning.

The additive allows the recovered liquid to be treated, in particular to avoid the formation of foam or the proliferation of bacteria, to prevent the formation of ice in winter or even to fragrance the liquid. It thus can act as an anti-foam, anti-bacterial additive, an alcohol, a soap, or even a fragrance.

The treatment device can be arranged at different levels of the liquid recovery system 1.

The treatment device thus can be located at the inlet of a liquid intake 5, such as the previously described grill 15a shown in FIGS. 2 to 6.

The treatment device also can be an intermediate decanting tank 21 arranged, for example, at the outlet 19 of the liquid intake 5, as previously described and shown in FIGS. 1 to 7.

It is also possible to contemplate arranging the treatment device at the outlet of the first tank 35, for example, between the first tank 35 and a second tank 43, as shown in FIG. 7. The second tank 43 can be, for example, the tank allowing the spray nozzles to be supplied in order to spray a cleaning liquid onto the windshield of the vehicle or onto another glazed surface belonging, for example, to an optical sensor, a camera.

The treatment device also can comprise a self-cleaning means, such as the valve 27 placed in the bottom 25 of the intermediate decanting tank 21, which can open in order to release the impurities accumulated therein.

Figure 6:
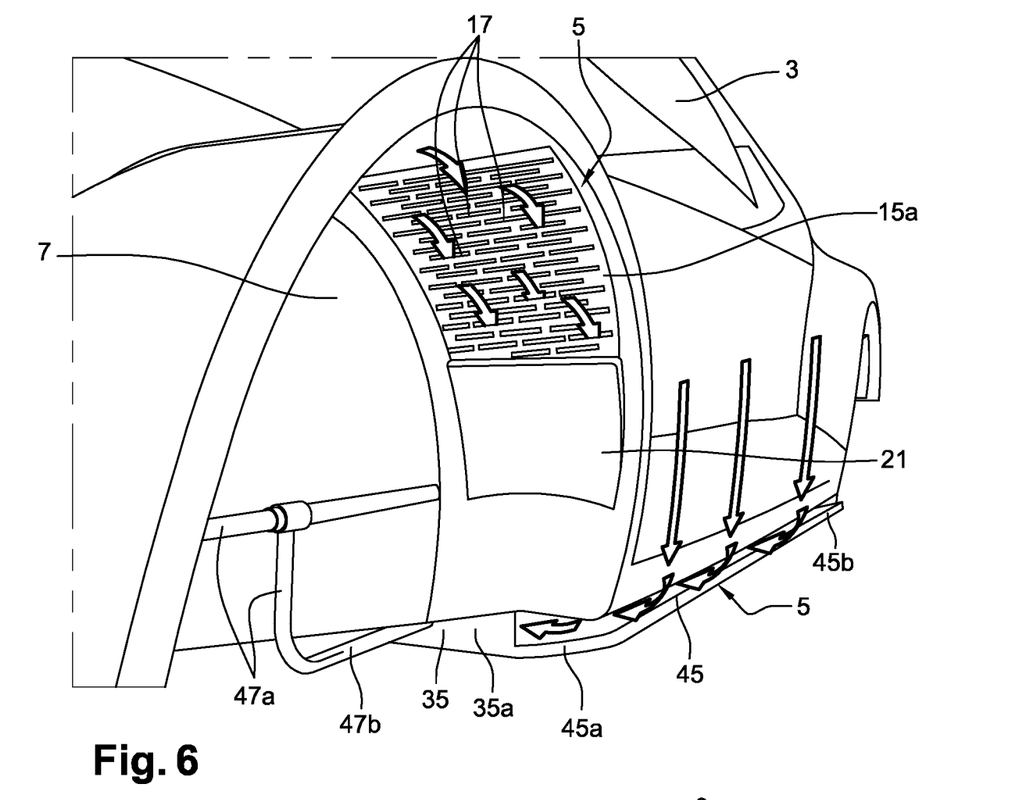
FIG. 6 is a perspective view showing the liquid intake of FIGS. 1 to 5 and a second example of a liquid intake.

FIG. 6 illustrates the first example of a liquid intake 5 described above in combination with a second example of a liquid intake 5 arranged on a side of the motor vehicle 3.

In this embodiment, the first tank 35 slightly exceeds the sides of the vehicle forming, on each side of the motor vehicle 3, a gutter 45, in which the liquid trickling over the bodywork of the motor vehicle 3 can be recovered. The gutter 45 thus forms an example of a liquid intake 5 according to the invention. The recovered liquid is then directly recovered in the first tank 35. In this case, each gutter 45 is a narrow channel having a longitudinal orientation and extending from a first end 45a located toward the front of the vehicle to a second end 45b located toward the rear of the vehicle. The gutters 45 in this case are located on the upper wall 37a of the first tank 35, along the side walls 37d outside it. Each gutter 45 is designed so as to collect the liquid trickling over the sides of the motor vehicle 3 and to facilitate its flow toward the first tank 35.

FIG. 7 illustrates a motor vehicle 3 equipped with a first embodiment of a liquid recovery system 1 according to the invention. In this embodiment, the liquid recovery system 1 comprises a plurality of liquid intakes 5, in particular the two examples of liquid intakes 5 previously seen, i.e. liquid intakes 5 arranged on the wheel arches 7 and on the sides of the vehicle.

In the embodiment illustrated herein, the liquid originating from the road is recovered by the liquid intakes 5 located on the wheel arches 7 and the liquid trickling over the motor vehicle 3 is recovered on the liquid intakes 5 located on either side of the sides of the vehicle. The amount of liquid recovered by the liquid intakes 5 located on the wheel arches 7 is, when the vehicle runs on a wet road, substantially greater than the amount of liquid recovered by the liquid intakes 5 located on either side of the sides of the vehicle.

The liquid originating from the road is partially filtered, before entering the liquid intakes 5 located on the wheel arches 7, by means of the grills 15a in order to eliminate the largest impurities, such as branches, leaves, gravel, etc.

The liquid that is thus recovered is subsequently decanted into the intermediate decanting tank 21 in order to continue cleaning the recovered liquid. At this stage, additional impurities are deposited on the bottom 25 of the intermediate decanting tank 21. The supernatant liquid is subsequently routed by means of a set of piping, in this case by pipes 47a, 47b connecting the intermediate tank 21 to the first tank 35. A pipe 47a is fixed to the outlet orifice 31 of each of the intermediate tanks 21. Thus, in this embodiment, each wheel arch 7 comprises two pipes 47a, which join at a third pipe 47b connected to one of the inlet orifices 39 of the first tank 35. In order to direct the liquid to the first tank 35, a first pump 49a is arranged on each of the inlet orifices 39 of the first tank 35.

Finally, the stored liquid is routed, by means of a pipe 47c connected to the outlet orifice 41 of the first tank 35, to the second tank 43. The pipe 47c extends between the first tank 35 and the second tank 43. It is designed to allow the liquid stored in the first tank 35 to be discharged toward the second tank 43.

The second tank 43 is used, in this case, to store the liquid for supplying spray nozzles for spraying a cleaning liquid onto the windshield of the vehicle and/or for cleaning the sensors. A second pump 49b is arranged at the outlet of the first tank 35 in order to direct the liquid to the second tank 43.

A filter cartridge 51 is arranged between the first tank 35 and the second tank 43 on the pipe 47c. The filter cartridge 51 allows filtration of impurities that also could be present in the recovered liquid and could damage the liquid recovery system 1 or even hinder the cleaning of the windshield or of the sensors.

As an alternative embodiment, not shown, and according to the arrangement of the various tanks, the flow can occur by gravity without requiring a pump or pumps.

In the second embodiment of a recovery system 1 according to the invention illustrated in FIGS. 8 to 11, the motor vehicle 3 is equipped with a liquid recovery system 1 comprising a single liquid intake 5 arranged on the underframe of the vehicle.

It is a third example of a liquid intake 5 in the form of a scoop arranged under the vehicle and comprising a slightly curved bottom 53 and a flat upper wall 55.

The scoop has an inlet 13b corresponding to an inlet extending over part of the width of the motor vehicle 3 along a transverse axis parallel to the axis of rotation of the wheels. This inlet 13b is provided with a flap 59 allowing the liquid recovery system 1 to open or close.

The flap 59 is pivotably mounted about a transverse axis. The flap 59 can adopt a first position, called closed position, and a second position, called open position.

In the closed position, the flap 59 plugs the inlet 13b of the liquid intake 5. This position is advantageous when the road is dry in order to avoid capturing impurities present on the road. Furthermore, this closed position avoids disrupting the aerodynamics of the vehicle, when the liquid intake 5 is not used.

In the open position, the flap 59 is raised and the inlet 13b can receive liquid originating from the highway, for example.

The flap 59 can transition from the open position to the closed position in a motorized manner. Opening and closing can be activated manually by the driver depending on the requirements and/or by virtue of sensors detecting the presence of liquid to be recovered and the need to recover liquid.

In order to collect the maximum amount of liquid, in the open position of the flap 59, the opening of the liquid intake 5 is oriented toward the front of the vehicle.

Figure 8:
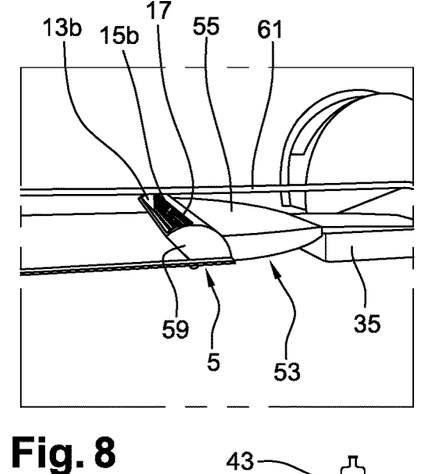
FIGS. 8 and 9 are perspective views of part of a second embodiment of a liquid recovery system according to the invention comprising a third example of a liquid intake.
Figure 9:
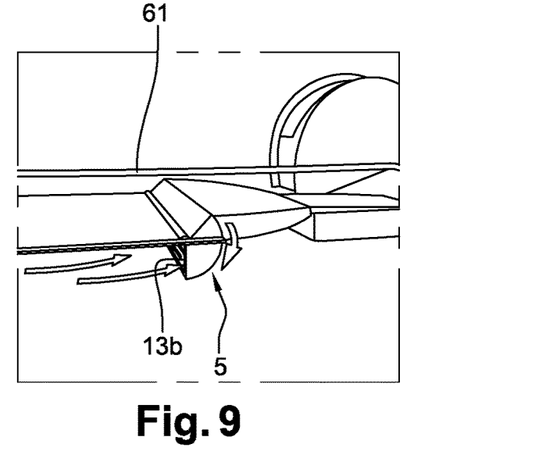
Figure 10:
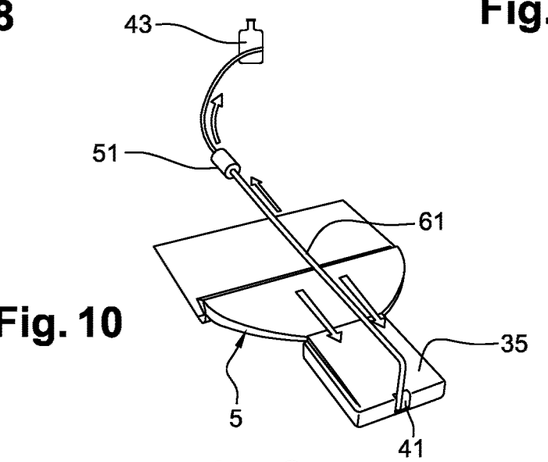
FIG. 10 is a perspective view of the assembly of the liquid recovery system of FIGS. 8 and 9.

In the example shown herein, the inlet 13b is provided with a grill 15b, as shown in FIG. 8. The grill 15b is similar to the grill 15a previously described for the first embodiment. It is a plate designed to be placed at the inlet of the liquid intake 5. The plate is provided with perforations 17. The perforations 17 are small openings or small through holes produced in the grill 15b. They are designed to allow liquid to enter through the plate, whilst retaining any impurities.

The scoop extends longitudinally from the inlet 13b to the rear of the motor vehicle 3. In this embodiment, the scoop extends to a first tank 35, whilst reducing the through section and thus is in the shape of a funnel.

As for the first embodiment, the first tank 35 is arranged in the underframe of the vehicle. In the illustrated example, the first tank 35 is arranged behind the liquid intake 5, in other words at the rear of the vehicle.

The first tank 35 is directly connected to the liquid intake 5. In other words, the liquid intake 5 emerges directly into the first tank 35 without the use of a set of piping, such as pipes.

The first tank 35 can have the same features as the first tank 35 of the first embodiment described above.

In order to route the stored liquid to the dispensing means, the first tank 35 comprises an outlet orifice 41. This outlet orifice is arranged behind the first tank 35. It is connected to a set of piping, in the form of a pipe 61, which is connected to a second tank 43.

As in the first example, this second tank 43 in this case is used to store liquid for supplying spray nozzles for spraying a cleaning liquid onto the windshield of the vehicle and/or for cleaning sensors.

In order to direct the liquid to the second tank 43, a pump (not shown) is disposed at the outlet of the first tank 35.

A filter cartridge 51 is also arranged between the first tank 35 and the second tank 43 on the pipe 61.

The operating mode for recovering, for storing and for redistributing the liquid is similar to that of the first embodiment.

Various options, not shown, also can be contemplated for the liquid recovery system 1.

In particular, the liquid recovery system 1 can comprise a device for heating the liquid. The heating device can be arranged, for example, in the first tank 35. The heating device can, for example, comprise heating films arranged in the first tank 35 to heat the stored liquid. The heating device also can be designed so that the liquid is heated by calories originating from an exhaust line of a combustion engine of the motor vehicle 3.

The liquid recovery system 1 also can comprise a means for manually filling the first tank 35. It can be, for example, an opening for connecting to an external liquid source.

Level sensors also can be provided in the liquid recovery system 1. In particular, a sensor for sensing the filling level of the first tank 35 can be contemplated in order to determine the water level in order to know, for example, if the tank has to be filled and/or to know if enough liquid is stored and can be used.

What is claimed is:

1. A liquid recovery system for a motor vehicle, the liquid recovery system comprising:

a first tank having a first tank inlet and an outlet orifice, the first tank being sized and shaped to be mounted below the beltline and on the underframe of the motor vehicle;

a second tank;

at least one scoop-shaped liquid intake having an inlet facing the front end of the motor vehicle and extending over part of the width of the motor vehicle, the scoop-shaped liquid intake being directly fluidically connected to the first tank inlet such that liquid entering the scoop-shaped liquid intake is directed through the first tank inlet and into the first tank;

a flap pivotably mounted on the scoop-shaped liquid intake, the flap being pivotably movable between a closed position where the flap plugs inlet and an open position where inlet can receive liquid;

a conduit fluidically connected to the outlet orifice and the second tank to facilitate liquid transport from the first tank to the second tank;

a pump for pumping liquid through the conduit from the first tank to the second tank; and a filter operably disposed within the fluid path defined by the conduit to remove contaminants from the liquid flowing through the conduit.

2. The liquid recovery system of claim 1 wherein the at least one scoop-shaped liquid intake includes a curved bottom and a flat upper wall.

3. The liquid recovery system of claim 1 further comprising:

a grill covering the inlet of the liquid intake to prevent solids above a predetermined size from entering the liquid intake.

4. The liquid recovery system of claim 3 wherein the grill includes a perforated plate.

5. The liquid recovery system of claim 1 further comprising:

a motor operably connected to the flap to move the flap between the open and the closed positions.

6. The liquid recovery system of claim 1 further comprising:

a manual means operably connected to the flap to move the flap between the open and closed positions.

7. The liquid recovery system of claim 1 wherein the first tank includes internal partitions defining a plurality of chambers that are fluidically connected or includes ribs arranged in the bottom of the first tank.

8. The liquid recovery system of claim 1 further comprising:

a sensor for sensing a liquid level in the first tank.

9. The liquid recovery system of claim 1 wherein the second tank is fluidically connected to at least one liquid dispensing means for cleaning windows or sensors of the vehicle.

* * * * *